United States Patent
Roh et al.

(10) Patent No.: US 9,241,343 B2
(45) Date of Patent: *Jan. 19, 2016

(54) ENHANCED ACCESS CHANNEL MASKS FOR XHRPD

(71) Applicant: LG ELECTRONICS INC., Seoul (KR)

(72) Inventors: Dongwook Roh, Anyang (KR); Sanggook Kim, San Diego, CA (US); Lihsiang Sun, San Diego, CA (US)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/083,138

(22) Filed: Nov. 18, 2013

(65) Prior Publication Data

US 2014/0071927 A1 Mar. 13, 2014

Related U.S. Application Data

(63) Continuation of application No. 13/227,690, filed on Sep. 8, 2011, now Pat. No. 8,605,753.

(60) Provisional application No. 61/386,912, filed on Sep. 27, 2010.

(51) Int. Cl.
*H04W 74/00* (2009.01)
*H04J 13/00* (2011.01)
(Continued)

(52) U.S. Cl.
CPC ......... *H04W 74/002* (2013.01); *H04J 13/0022* (2013.01); *H04J 13/10* (2013.01); *H04L 27/34* (2013.01)

(58) Field of Classification Search
CPC ... H04W 74/002; H04J 13/10; H04J 13/0022; H04L 27/34
See application file for complete search history.

(56) References Cited

U.S. PATENT DOCUMENTS 5,692,008 A * 11/1997 Van Nee .................... 375/148
5,727,064 A    3/1998 Reeds, III
(Continued)

FOREIGN PATENT DOCUMENTS

CN    101072440 A    11/2007
CN    101682481 A    3/2010
(Continued)

OTHER PUBLICATIONS

Sriram et al "Efficient Pseudo-Noise Sequence Generation Cor Spread-Spectrum Applications" Signal Processing Systems pp. 80-86 published Oct. 18, 2002.*

(Continued)

*Primary Examiner* — Andrew Lai
*Assistant Examiner* — Chuong M Nguyen
(74) *Attorney, Agent, or Firm* — Birch, Stewart, Kolasch & Birch, LLP

(57) ABSTRACT

A method of performing Pseudo-random-Noise (PN) quadrature covering for transmitting data via an access channel. The method according to one embodiment includes receiving a 42-bit access long code mask $MI_{ACMAC}$ and a 42-bit access long code mask $MQ_{ACMAC}$ from an upper layer; generating an MI mask and an MQ mask for PN quadrature covering by using certain bits of an assigned channel number for the access channel; performing exclusive OR operations on certain bits of the received access long code mask $MI_{ACMAC}$; performing exclusive OR operations on certain bits of the received access long code mask $MQ_{ACMAC}$; and transmitting signals via the access channel based on the generated 12-bit MI mask and the generated 12-bit MQ mask.

6 Claims, 14 Drawing Sheets

(51) Int. Cl.
*H04J 13/10* (2011.01)
*H04L 27/34* (2006.01)

(56) References Cited

U.S. PATENT DOCUMENTS

| | | | |
|---|---|---|---|
| 5,825,327 A * | 10/1998 | Krasner | 342/357.57 |
| 5,859,612 A * | 1/1999 | Gilhousen | 342/457 |
| 5,899,957 A * | 5/1999 | Loomis | 701/470 |
| 6,002,363 A * | 12/1999 | Krasner | 342/357.77 |
| 6,118,808 A * | 9/2000 | Tiemann et al. | 375/142 |
| 6,151,353 A * | 11/2000 | Harrison et al. | 375/136 |
| 6,735,185 B1 * | 5/2004 | Noneman | 370/335 |
| 2004/0242222 A1 | 12/2004 | An et al. | |
| 2006/0165041 A1 | 7/2006 | Song et al. | |
| 2008/0039013 A1 | 2/2008 | Chang et al. | |
| 2008/0307284 A1* | 12/2008 | Aghili et al. | 714/748 |
| 2009/0207951 A1* | 8/2009 | Kim et al. | 375/343 |

FOREIGN PATENT DOCUMENTS

| | | |
|---|---|---|
| JP | 9-121388 A | 5/1997 |
| JP | 2007-501580 A | 1/2007 |
| KR | 10-2010-0018030 A | 2/2010 |

OTHER PUBLICATIONS

Third Generation Partnership Project 2 "cdma2000 High Rate Packet Data Air Interface Specification", 3GPP2 C.S0024-A published Sep. 2006.*
Third Generation Partnership Project 2 ("xHRPD R&F Comments" 3GPP2C.P0098-200-0 v0.1 made available on Jun. 2010 pages ).*
3rd Generation Partnership Project 2 "3GPP2", "Physical Layer for cdma2000 Extended Cell High Rate Packet Data Air Interface Specification", 3GPP2 C.P0098-200-0, Version 0.1, Jun. 2010, pp. 1-101.
3GPP2 (Physical Layer Standard for cdma2000 Spread Spectrum Systems published on Feb. 18, 2004.
Kim, "xHRPD R&F Comments (submitted as C30-20100913-017)," to 3GPP2 C.P0098-200-0, Version 0.1, Jun. 2010, entitled "Physical Layer for cdma2000 Extended Cell High Rate Packet Data Air Interface Specification Revision 0," 119 pages.
3rd Generation Partnership Project 2 "3GPP2", "Physical Layer for cdma2000 Extended Cell High Rate Packet Data Air Interface Specification Revision 0," 3GPP2 C.P0098-200-0, Version 0.2, Sep. 2010, pp. 1-102 (120 pages).
Kim et al., "Enhanced Masks for PN Quadrature Covering in xHRPD," 3rd Generation Partnership Project 2 "3GPP2", TSG-C WG3, C30-20101025-015, 2010, p. 1-10 (11 pages).

\* cited by examiner

| Field | Length (bits) |
|---|---|
| MAC Layer Packet | 176 |
| FCS | 16 |

| Data Rate (kbps) | Physical Layer Packets Size (bits) | CRC | TAIL | MAC Packet (bits) | Code | Code Rate | Encoding Block Size (bits) | Packet Duration (ms) | Modulation Type | BW (kHz) |
|---|---|---|---|---|---|---|---|---|---|---|
| 2.4 | 192 | 16 | 0 | 176 | Tailbiting Conv | 1/4 | 48 | 80 | QPSK | 6.4 |

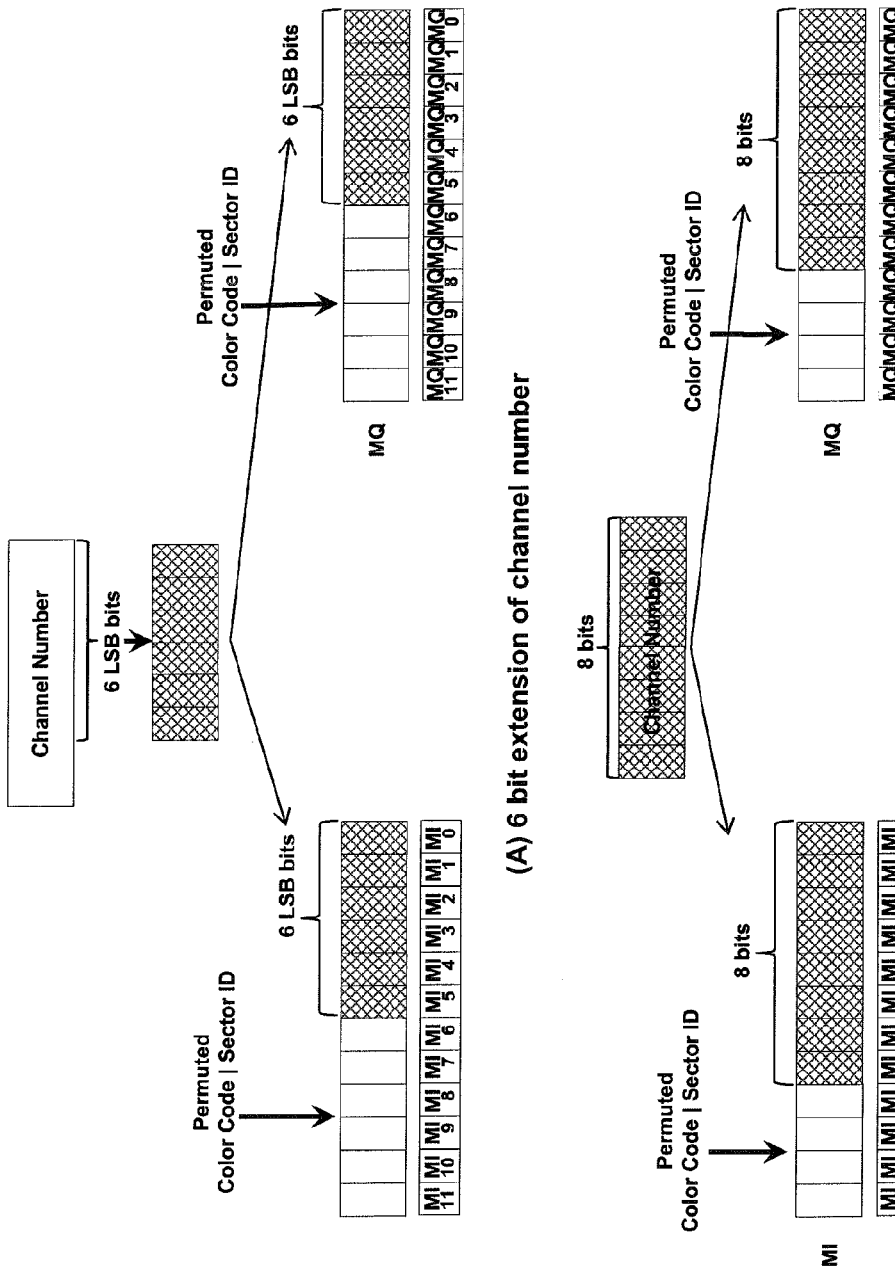

ENHANCED ACCESS CHANNEL MASKS FOR XHRPD

CROSS-REFERENCE TO RELATED APPLICATIONS

The present application is a 37 C.F.R. §1.53(b) continuation of co-pending U.S. patent application Ser. No. 13/227,690 filed on Sep. 8, 2011, which claims the benefit of U.S. Provisional Application No. 61/386,912, filed on Sep. 27, 2010. The entire contents of all these applications are hereby incorporated by reference.

BACKGROUND

In the related art, certain methods related to performing access channel procedures were problematic due to being susceptible to inter-cell interference which might make it difficult to differentiate between distinct access channels. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that certain methods related to performing access channel procedures are more efficiently and effectively performed. In particular, the embodiments in the present disclosure provide an enhanced method for generating masks for Pseudo-Noise (PN) quadrature covering in a so-called xHRPD (eXtended cell High Rate Packet Data) system, wherein the network and user devices support both LTE (Long-Term Evolution) and xHRPD dual mode operations.

BRIEF DESCRIPTION OF THE DRAWINGS

FIG. 9 shows two examples for 6-bit and 8-bit extensions of channel number in the generation of MI and MQ masks.

DETAILED DESCRIPTION

Figures 1, 2:
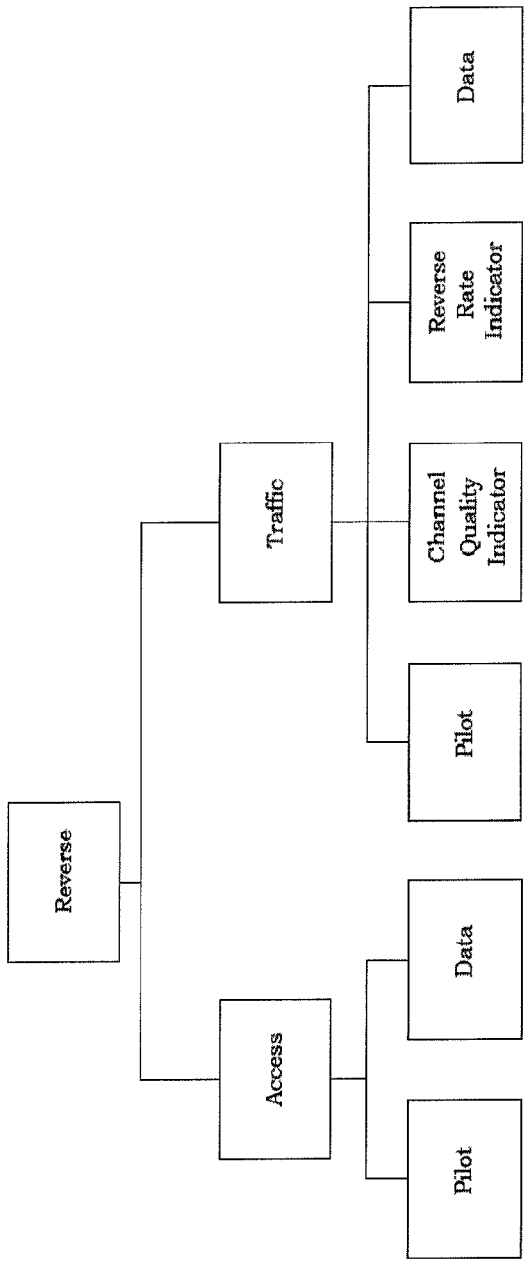
FIG. 1 shows an exemplary reverse channel structure in xHRPD.
FIG. 2 shows a table with formats that the Access Channel physical layer packets shall use.

The inventive concepts and features herein are generally explained in terms of 3GPP, 3GPP2, LTE, xHRPD, and M2M technologies. However, such details are not meant to limit the various features described herein, which are applicable to other types of mobile and/or wireless (radio) communication systems and methods.

Some preliminary terminology will be explained. A so-called Access Network (AN) refers to network equipment providing data connectivity between a packet switched data network (typically the Internet) and the access terminals. An access network is equivalent to a base station in other technical specifications. A so-called Access Terminal (AT) refers to a device providing data connectivity to a user. An access terminal may be connected to a computing device such as a laptop or personal computer or it may be a self-contained data device such as a personal digital assistant or smartphone. An access terminal is equivalent to a mobile station in other technical specifications.

Next, the basic concepts related to extended cell high rate packet data (xHRPD) technology will be described. EV-DO (Evolution-Data Optimized) is a popular name of the 3GPP2 standard 3G air interface for high-speed data. The technical specification calls it High Rate Packet Data, or HRPD. Recently, a new system enhancement from existing HRPD has been made to allow it to perform better in limited link-budget environments, such as in satellite and/or machine-to-machine (M2M or Machine-Type Communication: MTC) applications. The new system is called EXtended Cell High Rate Packet Data. Hereinafter, the xHRPD will be used to denote such Extended Cell High Rate Packet Data system.

For hybrid satellite/terrestrial networks, xHRPD is intended to allow a handset to operate with the greater path losses of long satellite links yet have the same form factor as a typical smartphone. For M2M, it will improve reliability in cases of increased building attenuation and more-distant telemetry devices. Targeted services include 2 kbps VoIP and low-rate data, down to 640 bps.

The biggest physical-layer change from today's HRPD is that the reverse link is channelized in a new, narrowband manner. The typical 1.25 MHz spread-spectrum bandwidth is changed to 192 narrowband FDM (Frequency Division Modulated) channels, each channel 6.4 kHz wide. A terminal is assigned one or two of these channels. These channels are orthogonal, reducing intra-cell interference and improving the link-budget. Narrowband channels reduce search time and need less link-margin than wide-bandwidth channels. New coding and reduced overhead improves link efficiency for small packets. Changes to the MAC (Medium Access Control) layer also help.

In HPRD, forward link transmission relies on a Channel Quality Indicator (CQI) sent periodically by the terminal. xHRPD can send a constant CQI value for a longer period of time to allow coherent combining of long-delayed, weak CQI symbols at the access network. This means the data rate does not change as often on the forward link.

To accommodate long satellite path delays and large satellite cells, a new narrowband Access Channel uses the Slotted Aloha protocol. The modified reverse link power-control channel operates at 50 bps instead of the typical 150 bps. Hybrid ARQ (HARQ) is disabled in the xHRPD protocol due to the long path delays.

FIG. 1 shows an exemplary reverse channel structure in xHRPD, which focuses the changes on the reverse link to maximize link margin and improve link efficiency for small packets. In order to maximize the link margin, new lower data rates are introduced, i.e., 2.4 kbps for Access and 640 bps for Traffic as a lowest data rate, while the HRPD offers the RL lowest data rates, i.e., 9.6 kbps for Access and 4.8 kbps for Traffic. In addition, link efficiency is improved by better coding schemes and reduced overheads in CRC, tail bits, header, etc.

Most of changes have effects on the reverse link, but not on the forward link. Especially, a narrowband reverse link is one of key features among reverse link changes. This change is because the xHRPD should operate mostly in a power limited communication environment because the majority of terminals do not have an enough link margin to take advantage of wider bandwidth. This narrowness of the reverse link may suffer from severe intra-cell interference, which requires the new reverse channel(s) to be robust to interference; thus resulting in the need for orthogonal reverse channels. On the other hand, the narrowband reverse link gives some advantages in implementation, such as dramatically reduced time search space and less stringent requirements on the power and rate control subsystems.

A Reverse Access Channel refers to the portion of the Reverse Channel that is used by access terminals to communicate with the access network when they do not have a traffic channel assigned. There is a separate Reverse Access Channel for each sector of the access network.

Since the bandwidth of reverse link is shrunk in xHRPD, a narrowband access channel could be a natural extension for HRPD. The narrowband access channel could dramatically reduce the Pseudo-Noise (PN) search space. For example, assuming a 1,000 km diameter cell having about a 6 ms round trip delay variation, then only narrowband symbols exist in the search space while there are more than 7,000 CDMA chips for the PN search space in HRPD. Also, use of the narrowband access channel gives an advantage in link budget due to lowered transmission power of the access channel. However, possible collisions could be a severe issue for a narrowband access channel, which might be overcome by using a slotted Aloha operation. In order to avoid collisions, many access channel operation parameters have been updated and reconfigured. However, only one support rate of the access channel exists; 2.4 kbps.

Hereinafter, the reverse access channel will be explained in more detail. The length of an Access Channel physical layer packet shall be 192 bits. Each Access Channel physical layer packet shall carry one Access Channel MAC layer packet. Access Channel physical layer packets shall use the following format shown in the Table of FIG. 2.

Figures 3, 4:
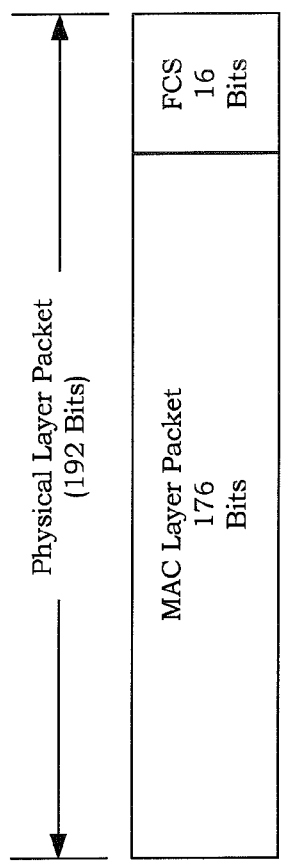
FIG. 3 shows an example of a physical layer packet having a MAC layer packet and a Frame Check Sequence.
FIG. 4 shows a table that summarizes the modulation and packet format information for the Access Channel.

In FIG. 2, the MAC Layer Packet denotes a MAC layer packet from the Access Channel MAC Protocol and FCS denotes a Frame Check Sequence. The FCS is sometimes called a Cyclic Redundancy Check (CRC) sequence in other technical specifications, which plays a role to give a method for the receiver to check the correctness of decoded or demodulated data. Its exemplary format is illustrated in FIG. 3.

The Access Channel is used by the access terminal to initiate communication with the access network or to respond to an access terminal directed message. The Access Channel consists of a Pilot Channel and a Data Channel. The Access Channel shall use the same 20 ms frame structure as that of the Reverse Traffic Channel. All the MAC Channel related symbols, namely the RRI (Reverse Rate Indicator) and the CQI (Channel Quality Indicator), shall be replaced by the pilot symbols.

The Access Channel shall support the (1,4,192) transmit format, namely a 192-bit data packet transmitted in a 6.4 kHz channel that lasts four 20 ms frames, which corresponds to 2.4 kbps data rate. Each frame consists of 48 bits and shall be encoded separately using a rate ¼ tail-biting convolutional code. The coded bits shall be QPSK (Quadrature Phase-Shift Keying) modulated. FIG. 4 shows a table that summarizes the modulation and packet format information for the Access Channel.

An access probe shall consist of a preamble followed by one or more Access Channel physical layer packets. During the preamble, all the symbols in a frame shall be pilot symbols. The preamble length is specified by the parameter 'PreambleLength' in units of frames.

Figure 5:
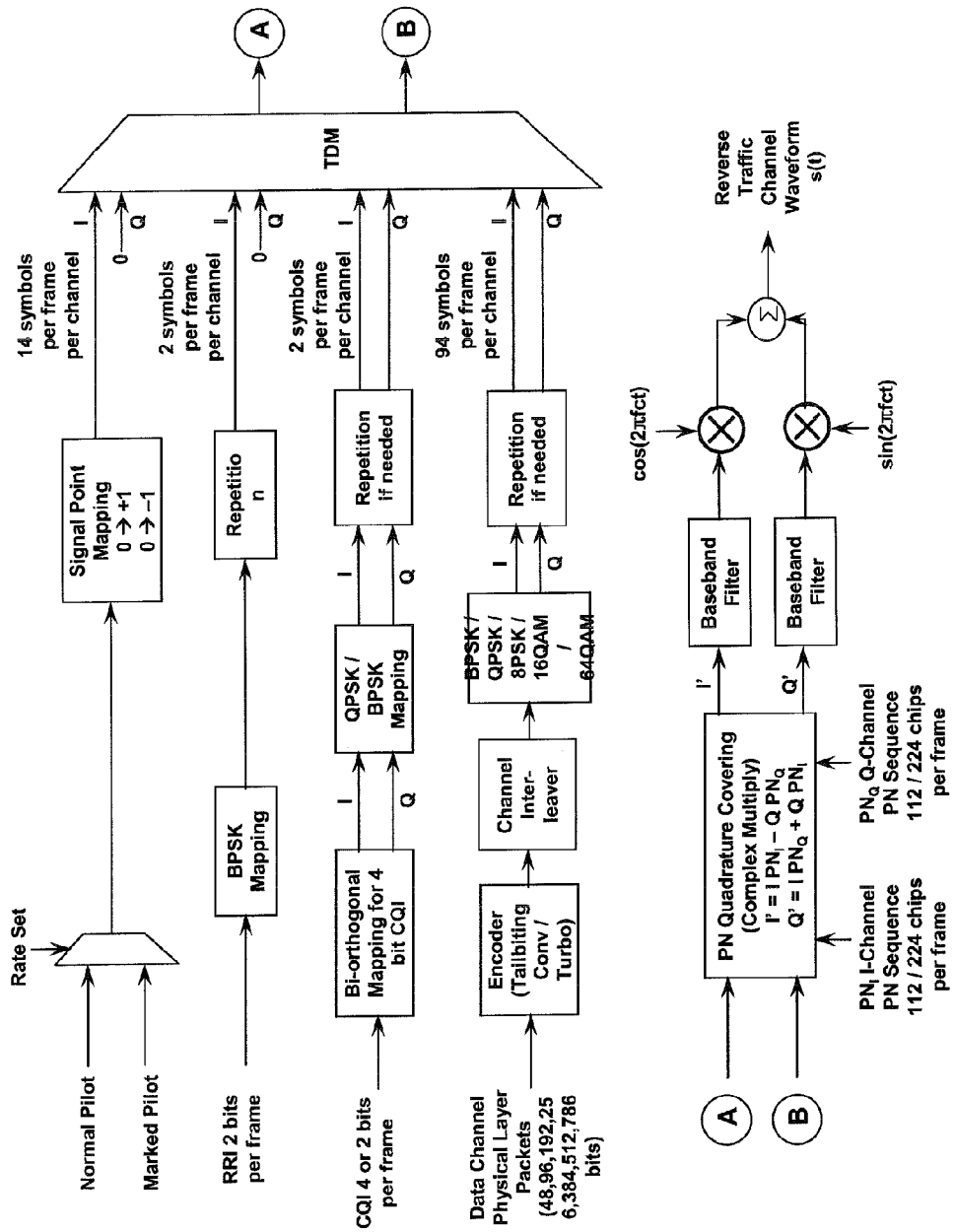
FIG. 5 shows a conceptual diagram of a transmission chain for the reverse access channel.

The reverse access channel transmits 192 bits using the same transmission chain as reverse traffic channel, which is depicted in the FIG. 5. The transmission chains for all reverse channels are shown, and merely for convenience, the blocks actually used for reverse access channel are shaded.

Figure 6:
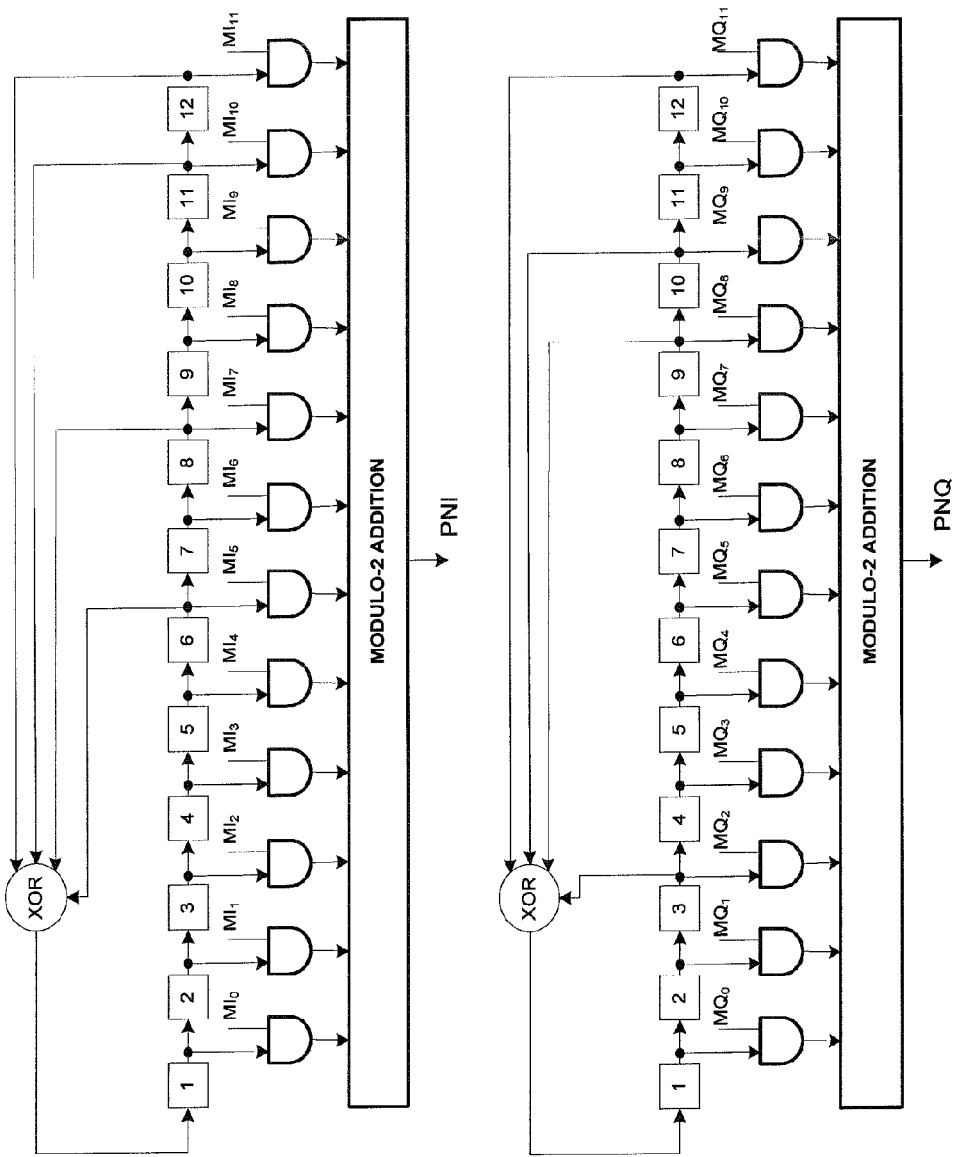
FIG. 6 shows a conceptual diagram for Pseudo-Noise (PN) quadrature covering blocks with an upper block that is a generator for PNI and a lower block that is a generator for PNQ.

Hereinafter, the Pseudo-Noise (PN) quadrature covering blocks will be explained further. One exemplary generation structure for a PN sequence is illustrated in FIG. 6. The depicted upper block is a generator for PNI which is a masked PN sequence for the I (In-phase) branch, while the depicted lower block is a generator for PNQ which is a masked PN sequence for the Q (Quadrature-phase) branch. The PNI is a sequence summed by a 12-bit masking sequence MI and a PN sequence generated by a polynomial $PI(x)=x12+x6+x4+x+1$ with initial stated loaded as 1000 0000 0000 (MSB output first). PNQ is a sequence summed by a 12-bit masking sequence MQ and a PN sequence generated by a polynomial $PQ(x)=x12+x9+x3+x2+1$ with initial state loaded as 0101 0101 0101 (MSB output first). It should be noted that the common short PN sequence generator shall be reloaded with the above initial state at the boundary of every 80 ms (48 slots). The masks MI and MQ shall be set to the lower 12 bits of the 42-bit user specific long code masks, $MI_{ACMAC}$ and $MQ_{ACMAC}$ (given as public data of the Reverse Traffic Channel MAC Protocol), respectively. When the lower 12 bits of the 42 bit long code mask are all "0"s, the mask shall be set to one "1" (MSB) followed by eleven "0"s.

The masks MI, MQ are generated by taking the lower 12 bits out of 42 bit Access Channel long code masks $MI_{ACMAC}$, $MQ_{ACMAC}$. The Access Channel long code masks are $MI_{ACMAC}$, $MQ_{ACMAC}$ composed of three parts: a fixed preamble, an Access Cycle Number and a permuted sequence of color code and LSB of sector ID. The Access Cycle Number is defined as "SystemTime mod 256" where 'SystemTime' is the CDMA System Time in slot corresponding to slot in which the first access probe preamble for this access probe is sent and "mod" indicates a modular operation by the following number "256". The 'ColorCode' is given as public data of Overhead Messages Protocol and corresponds to the sector to which the access terminal is sending the access probe. The 'SectorID' is given as public data of the Overhead Messages Protocol and corresponds to the sector to which the access terminal is sending the access probe. The exemplary permutation method is fully described in FIG. 7. The $MQ_{ACMAC}$ is a one-bit shift left version of $MI_{ACMAC}$ except the LSB, which is generated by exclusive OR summing of various bits shown in FIG. 7.

To be more specific, the permutation for $MI_{ACMAC}$ is defined in Equation 1, the single-bit shift left for $MQ_{ACMAC}$ is explained in Equation 2 and the LSB generation of $MQ_{ACMAC}$ is described in Equation 3. In Equation 3, the $\oplus$ symbol denotes an Exclusive OR operation, and $MQ_{ACMAC}[i]$ and $MI_{ACMAC}[i]$ denote the i-th least significant bit of $MQ_{ACMAC}$ and $MI_{ACMAC}$, respectively.

ColorCode|SectorID[23:0]=(S31,S30,S29,...,S0)  [Equation 1]

1. Permuted(ColorCode|SectorID[23:0])=(S0, S31, S22, S13, S4, S26, S17, S8, S30, S21, S12, S3, S25, S16, S7, S29, S20, S11, S2, S24, S15, S6, S28, S19, S10, S1, S23, S14, S5, S27, S18, S9).

$MQ_{ACMAC}[k]=MI_{ACMAC}[k-1]$, for $k=1,\ldots,41$  [Equation 2]

$MQ_{ACMAC}[0]=MI_{ACMAC}[0]\oplus MI_{ACMAC}[1]\oplus MI_{ACMAC}[2]\oplus MI_{ACMAC}[4]\oplus MI_{ACMAC}[5]\oplus MI_{ACMAC}[6]$
$\oplus MI_{ACMAC}[9]\oplus MI_{ACMAC}[15]\oplus MI_{ACMAC}[16]$
$\oplus MI_{ACMAC}[17]\oplus MI_{ACMAC}[18]\oplus MI_{ACMAC}[20]$
$\oplus MI_{ACMAC}[21]\oplus MI_{ACMAC}[24]\oplus MI_{ACMAC}[25]$
$\oplus MI_{ACMAC}[26]\oplus MI_{ACMAC}[30]\oplus MI_{ACMAC}[32]$
$\oplus MI_{ACMAC}[34]\oplus MI_{ACMAC}[41]$  [Equation 3]

Figure 7:
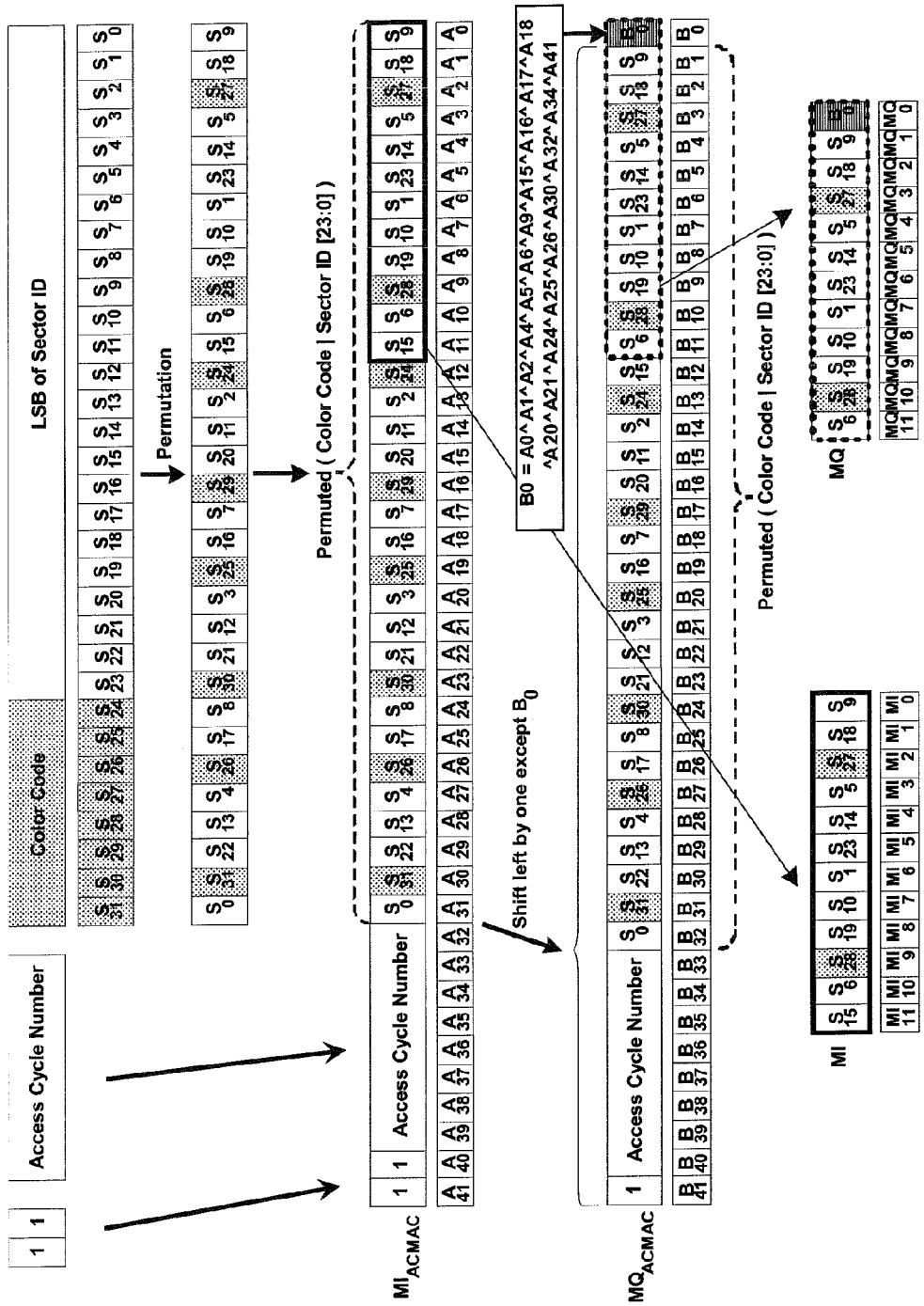
FIG. 7 shows an example for the generation of MI and MQ masks using a permutation method for the Access Channel long code masks $MI_{ACMAC}$ and $MQ_{ACMAC}$, each composed of three parts: a fixed preamble, an Access Cycle Number and a permuted sequence of color code and LSB of sector ID.

The masks for PN quadrature covering, MI and MQ, are generated by taking lower 12 bits of Access Channel long code masks, $MI_{ACMAC}$ and $MQ_{ACMAC}$ respectively. The generation of PN quadrature covering masks, MI and MQ, are also illustrated in FIG. 7.

The masks described thus far may cause a problem. Use of the lower 12-bits of the 42-bit access long code masks $MI_{ACMAC}$ and $MQ_{ACMAC}$ results in same access masks for all access channels belonging to a particular sector. This may become a problem when two access channels are on adjacent narrowband channels. The access searcher uses multiple Doppler hypotheses and it may pick up energy when an access probe is transmitted on the adjacent narrowband channel.

Figure 8A:
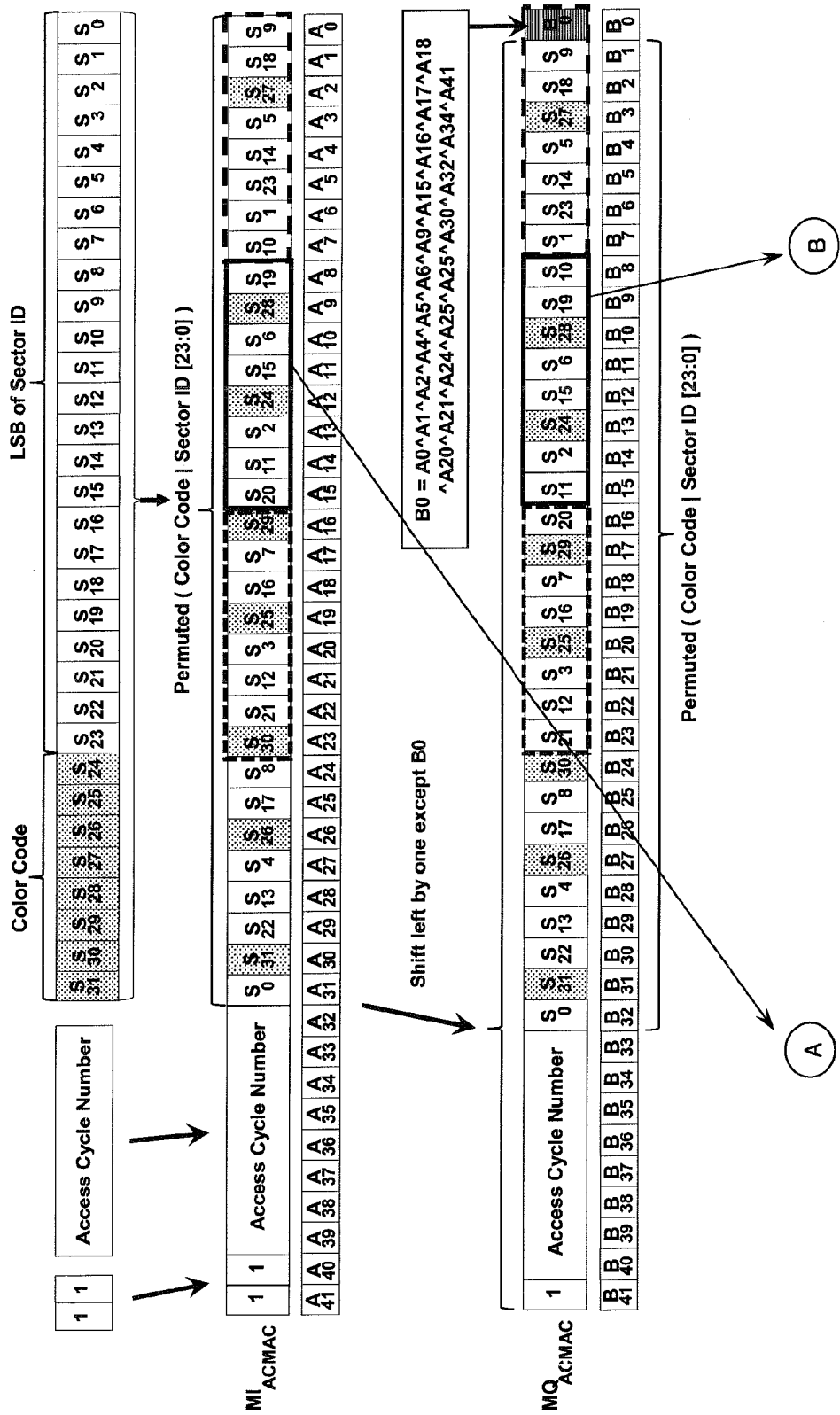
FIGS. 8A and 8B show another example for the generation of MI and MQ masks using a permutation method for the Access Channel long code masks $MI_{ACMAC}$ and $MQ_{ACMAC}$.
Figure 8B:
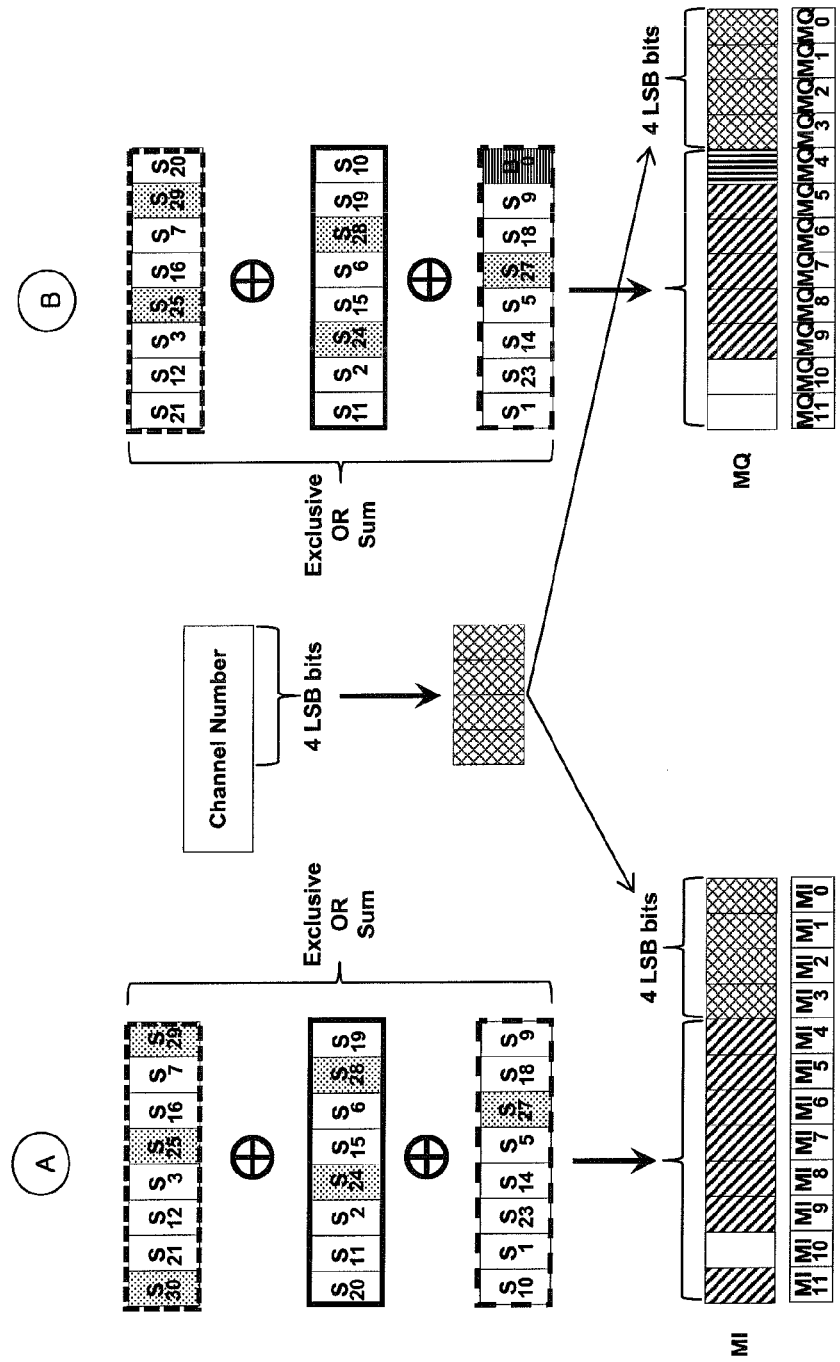

To overcome such problem, the MI and MQ masks can be changed as illustrated in FIGS. 8A-8B and the details are as follows:

Enhancement 0 of Masks for PN Quadrature Covering: MI and MQ

To transmit on the Access channel, the 12-bit masks MI and MQ shall be determined as follows. Bits MI3 to MI0 and MQ3 to MQ0 shall be set to the lower 4 bits of assigned channel number. Bits MI11 to MI4 shall be set equal to the result of (A23 to A16)$\oplus$(A15 to A8)$\oplus$(A7 to A0), where A23 to A0 are lower 24 bits of 42-bit access long code mask $MI_{ACMAC}$ (given as public data of the Access Channel MAC Protocol). Similarly, Bits MQ11 to MQ4 shall be set to the result of (B23 to B16)$\oplus$(B15 to B8)$\oplus$(B7 to B0), where B23 to B0 are lower 24 bits of 42-bit access long code mask $MQ_{ACMAC}$ (given as public data of the Access Channel MAC Protocol). Here, the $\oplus$ symbol denotes an Exclusive OR operation. If the above operation results in an all-zero mask, the mask shall be set to one "1" (MSB) followed by eleven "0"s.

A further enhancement to the procedures described above may be possible.

If two Access Channels are transmitted in the adjacent channels in one sector and two Access Terminals are moving at a high speed, the Doppler effect creates interference from one channel to another channel. Since xHRPD adopts a very narrow band in the Access Channel, the interference may cause severe problems. At the speed of 100 miles/hr with a 2 GHz center frequency, the maximum Doppler drift of transmission frequency is about 296 Hz. However, in the receiver side, several harmonics based on the max Doppler frequency are inevitable and could be the most cause of problems. In the previous example, the $3^{rd}$ harmonics would be 889 Hz and the $5^{th}$ harmonics would be 1.48 KHz, which may occupy nearly a quarter of the adjacent Access Channel. Therefore, the distinction between close or adjacent Access Channels would be one of the key issues to consider. To differentiate between Access Channels, the channel number is incorporated in the PN quadrature covering masks, MI and MQ. If we need more robustness in the Access Channel, more bits can be allocated to the object of channel number differentiation. Currently, 4 bits are used for channel number distinction, but we propose 6 bits or 8 bits for channel numbers. These channel number extensions to 6 bits or 8 bits are illustrated in FIGS. 8A-8B.

Since the number of bits solely reserved for permuted color code and sector ID decreased to 6 bits or 4 bits, special care should be taken in design of remaining parts. The simplest solution is overlay existing color code and sector ID generation method. This results in an overlap of 2 bits or 4 bits with minimal change from the existing scheme. In such overlapped part, the exclusive OR operation(s) will be used to get the desired results. Another method is to newly design the remaining parts by shrinking the color code and sector ID parts to 6 bits or 4 bits.

With reference to FIG. 9, two examples for the generation of MI and MQ for enhancement of extending the number bits of channel number are shown. To be more specific, the generation of MI and MQ masks for enhancement of extending number bits of channel number to 6 is as follows:

Enhancement 1 of Masks for PN Quadrature Covering: MI and MQ

To transmit on the Access channel, the 12-bit masks MI and MQ shall be determined as follows. Bits MI5 to MI0 and MQ5 to MQ0 shall be preset to the lower 6 bits of assigned channel number.

Bits MI11 to MI6 shall be set equal to the result of (A23 to A18)$\oplus$(A15 to A10)$\oplus$(A7 to A2), where A23 to A2 are lower 22 bits of 42-bit access long code mask $MI_{ACMAC}$ (given as public data of the Access Channel MAC Protocol). Bits MI5 to MI4 shall be further set equal to the result of (A17 to A16)$\oplus$(A9 to A8)$\oplus$(A1 to A0)$\oplus$(MI5 to MI4) preset by channel number, where A1 to A0 are lower 2 bits of 42-bit access long code mask $MI_{ACMAC}$.

Bits MQ11 to MQ6 shall be set to the result of (B23 to B18)$\oplus$(B15 to B10)$\oplus$(B7 to B2), where B23 to B2 are lower 22 bits of 42-bit access long code mask $MQ_{ACMAC}$ (given as public data of the Access Channel MAC Protocol). Bits MQ5 to MQ4 shall be further set equal to the result of (B17 to B16)$\oplus$(B9 to B8)$\oplus$(B1 to B0)$\oplus$(MQ5 to MQ4) preset by channel number, where B1 to B0 are lower 2 bits of 42-bit access long code mask $MQ_{ACMAC}$.

Here, the $\oplus$ symbol denotes an Exclusive OR operation. If the above operation results in an all-zero mask, the mask shall be set to one "1" (MSB) followed by eleven "0"s.

Another enhancement of extending number bits of channel number to 8 is as follows:

Enhancement 2 of Masks for PN Quadrature Covering: MI and MQ

To transmit on the Access channel, the 12-bit masks MI and MQ shall be determined as follows. Bits MI7 to MI0 and MQ7 to MQ0 shall be preset to the lower 8 bits of the assigned channel number.

Bits MI11 to MI8 shall be set equal to the result of (A23 to A20)$\oplus$(A15 to A12)$\oplus\oplus$(A7 to A4), where A23 to A4 are lower 20 bits of 42-bit access long code mask $MI_{ACMAC}$ (given as public data of the Access Channel MAC Protocol). Bits MI7 to MI4 shall be further set equal to the result of (A19 to A16)⊕(A11 to A8)⊕(A3 to A0)⊕(MI7 to MI4) preset by channel number, where A3 to A0 are lower 4 bits of 42-bit access long code mask $MI_{ACMAC}$.

Bits MQ11 to MQ8 shall be set to the result of (B23 to B20)⊕(B15 to B12)⊕(B7 to B4), where B23 to B4 are lower 20 bits of 42-bit access long code mask $MQ_{ACMAC}$ (given as public data of the Access Channel MAC Protocol). Bits MQ7 to MQ4 shall be further set equal to the result of (B17 to B16)⊕(B11 to B8)⊕(B3 to B0)⊕(MQ7 to MQ4) preset by channel number, where B3 to B0 are lower 4 bits of 42-bit access long code mask $MQ_{ACMAC}$.

Here, the ⊕ symbol denotes an exclusive OR operation. If the above operation results in an all-zero mask, the mask shall be set to one "1" (MSB) followed by eleven "0"s.

Figure 10A:
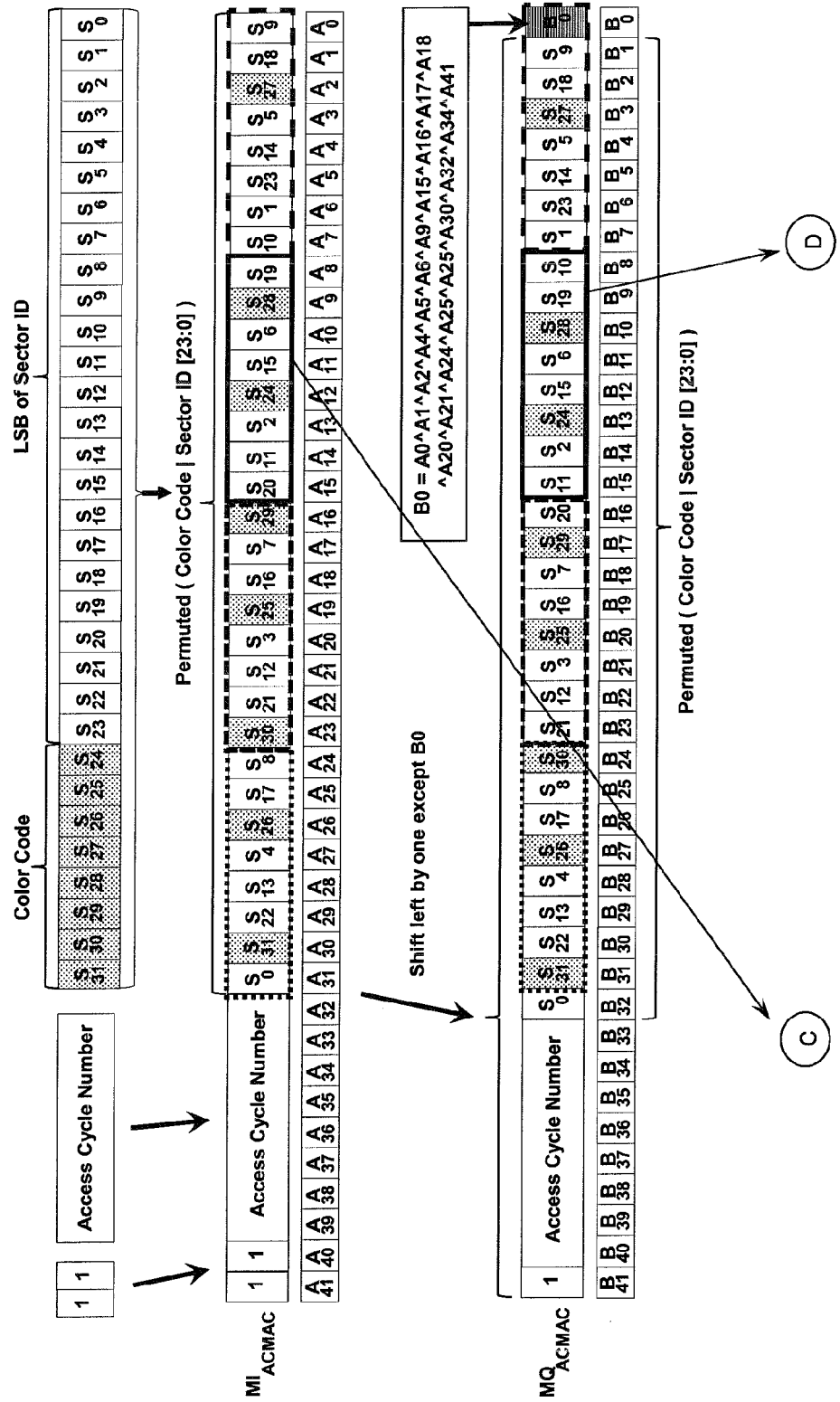
FIGS. 10A and 10B show a further example for the generation of MI and MQ masks using a permutation method for the Access Channel long code masks $MI_{ACMAC}$ and $MQ_{ACMAC}$ that also considers the permuted color code and the sector ID part.
Figure 10B:
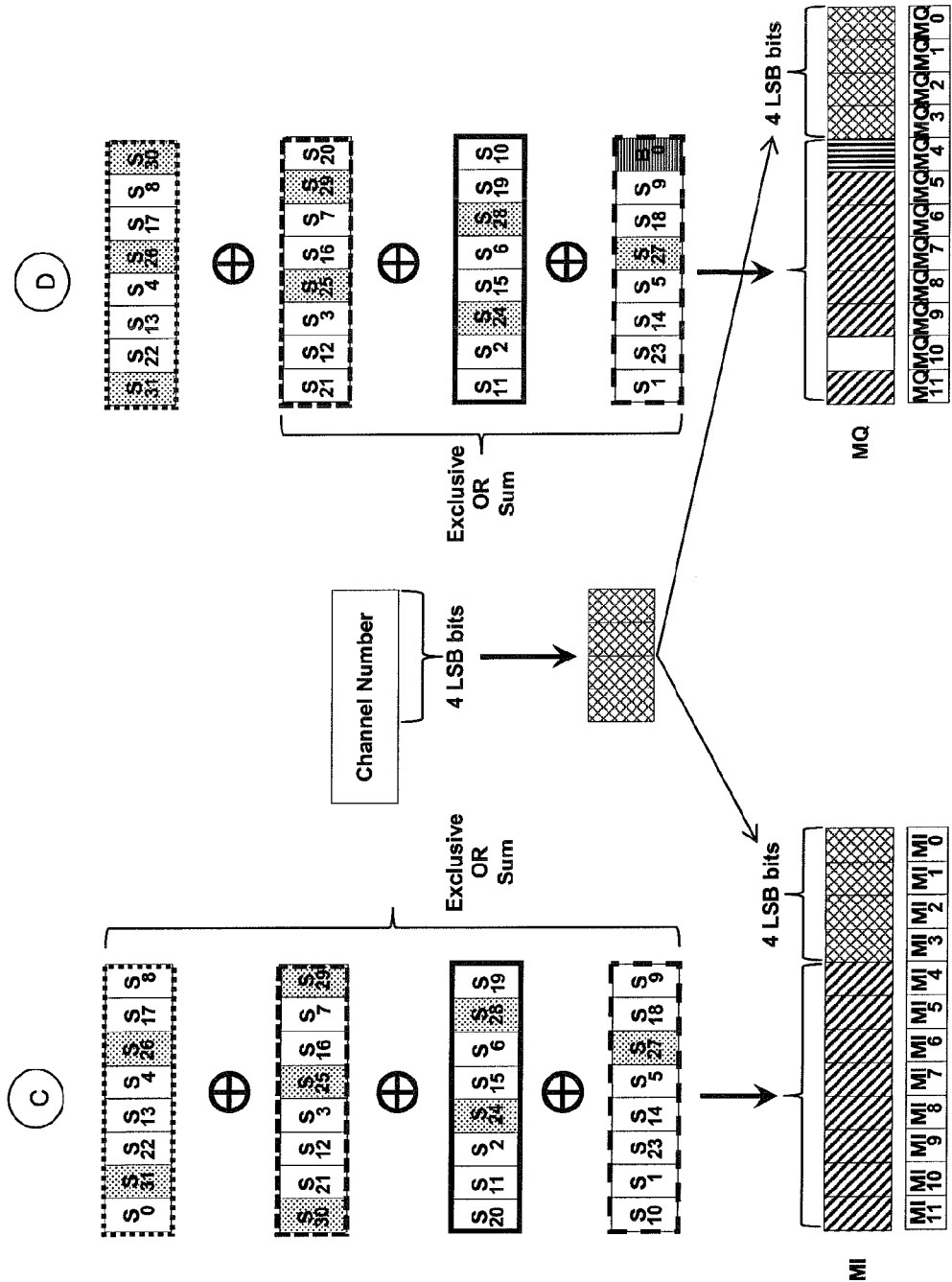

As a further enhancement, the permuted color code and the sector ID part may be considered, as per FIGS. 10A and 10B.

If the two Access Channels are transmitted in the same channel in two adjacent sectors and two Access Terminals are located near each other, the two Access channels could interfere with each other. Since it is highly probable that the two adjacent sectors have little difference in Sector ID, effects of the LSB difference in Sector ID on the generations of masks would be one of the key criterions in mask design. However, the mask generation in FIGS. 8A and 8B do not reflect the effect of LSB difference in Sector ID. For example, the first LSB of Sector ID ($S_0$) $5^{th}$ LSB ($S_4$), and $9^{th}$ LSB ($S_8$) and are not counted in the calculations. That is because the calculation of the upper part 8 bits in the masks MI and MQ, does not include the MSB 8 bits, from $25^{th}$ bit $S_{24}$ to $32^{nd}$ bit $S_{31}$, out of original long code masks $MI_{ACMAC}$ and $MQ_{ACMAC}$. The simple solution to overcome this problem is to add more 8 bits from the long code masks when performing calculation of the MSB 8 bits of MI and MQ, as illustrated in FIGS. 10A-10B.

To be more specific, the generation of MI and MQ is as follows:

Enhancement 3 of Masks for PN Quadrature Covering: MI and MQ

To transmit on the Access channel, the 12-bit masks MI and MQ shall be determined as follows. Bits MI3 to MI0 and MQ3 to MQ0 shall be set to the lower 4 bits of the assigned channel number. Bits MI11 to MI4 shall be set equal to the result of (A31 to A24)⊕(A23 to A16)⊕(A23 to A16)⊕(A15 to A8)⊕(A7 to A0), where A31 to A0 are lower 32 bits of 42-bit access long code mask MIACMAC (given as public data of the Access Channel MAC Protocol). Similarly, Bits MQ11 to MQ4 shall be set to the result of (B31 to B24)⊕(B23 to B16)⊕(B15 to B8)⊕(B7 to B0), where B31 to B0 are lower 32 bits of 42-bit access long code mask MQACMAC (given as public data of the Access Channel MAC Protocol). Here, the ⊕ symbol means an exclusive OR operation. If the above operation results in all zero mask, the mask shall be set to one "1" (MSB) followed by eleven "0"s. The changed parts in comparison to FIGS. 8A-8B are underlined in the above description (i.e. (A31 to A24) and (B31 to B24)).

In FIGS. 10A-10B, special care should be taken in interpretation of MQ design, because the original long code mask $MQ_{ACMAC}$ is a one-bit shift left version of the $MI_{ACMAC}$. To take into consideration all the omitted bits from Sector ID, the 9 bits from the $25^{th}$ bit $S_{24}$ to the $33^{rd}$ bit $S_p$ out of the original long code mask $MQ_{ACMAC}$ should be incorporated into the calculation of the MQ mask. It should be noted that the $5^{th}$ bit of MQ (MQ4) in FIGS. 10A-10B is nothing but a combination of several bits of the $MQ_{ACMAC}$, which are already considered in other bits and irrespective of the LSB of sector ID ($S_0$). In addition, it should be also noted that the LSB of sector ID ($S_0$) is never considered in the design of MQ in FIGS. 10A-10B. To improve the MQ design even more, it is proposed to incorporate the $33^{rd}$ bit $S_{32}$ out of the original long code mask $MQ_{ACMAC}$ into the $5^{th}$ bit of MQ ($M_4$). This is because the $5^{th}$ bit of the MQ ($M_4$) is could be omitted without having harmful effects on the other bits. To be more specific, the generation of MI and MQ is as follows:

Enhancement 4 of Masks for PN Quadrature Covering: MI and MQ

To transmit on the Access channel, the 12-bit masks MI and MQ shall be determined as follows. Bits MI3 to MI0 and MQ3 to MQ0 shall be set to the lower 4 bits of the assigned channel number. Bits MI11 to MI4 shall be set equal to the result of (A31 to A24)⊕(A23 to A16)⊕(A15 to A8)⊕(A7 to A0), where A31 to A0 are lower 32 bits of the 42-bit access long code mask $MI_{ACMAC}$ (given as public data of the Access Channel MAC Protocol). Similarly, Bits MQ11 to MQ4 shall be set to the result of (B31 to B24)⊕(B23 to B16)⊕(B15 to B8)⊕(B7 to B1, B32), where B32 to B1 are the lower 32 bits of the 42-bit access long code mask $MQ_{ACMAC}$ (given as public data of the Access Channel MAC Protocol) and B32 is located at the LSB. Here, the ⊕ symbol denotes an exclusive OR operation. If the above operation results in an all-zero mask, the mask shall be set to one "1" (MSB) followed by eleven "0"s.

Figure 11A:
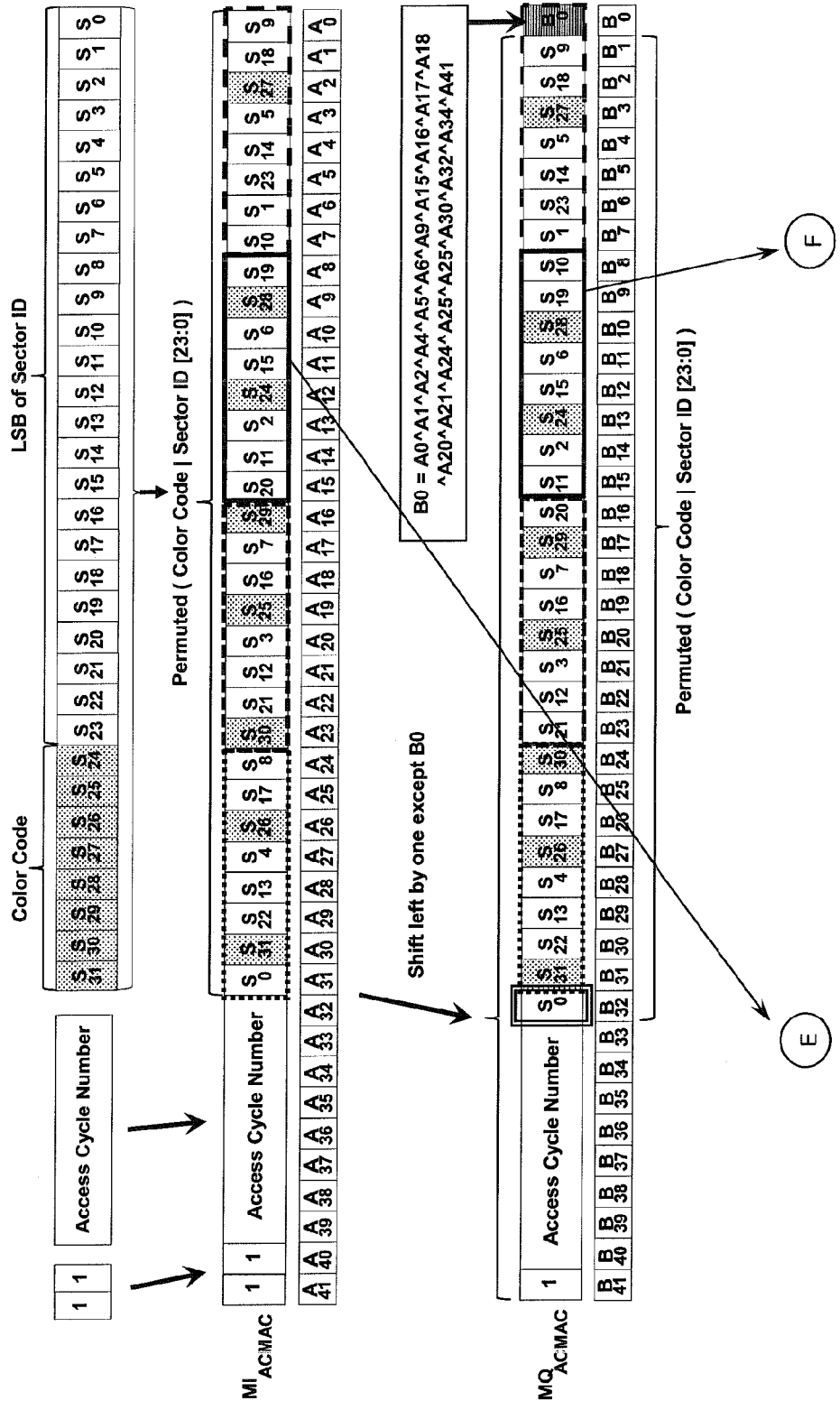
FIGS. 11A and 11B show an exemplary final version of the generated MI and MQ masks.
Figure 11B:
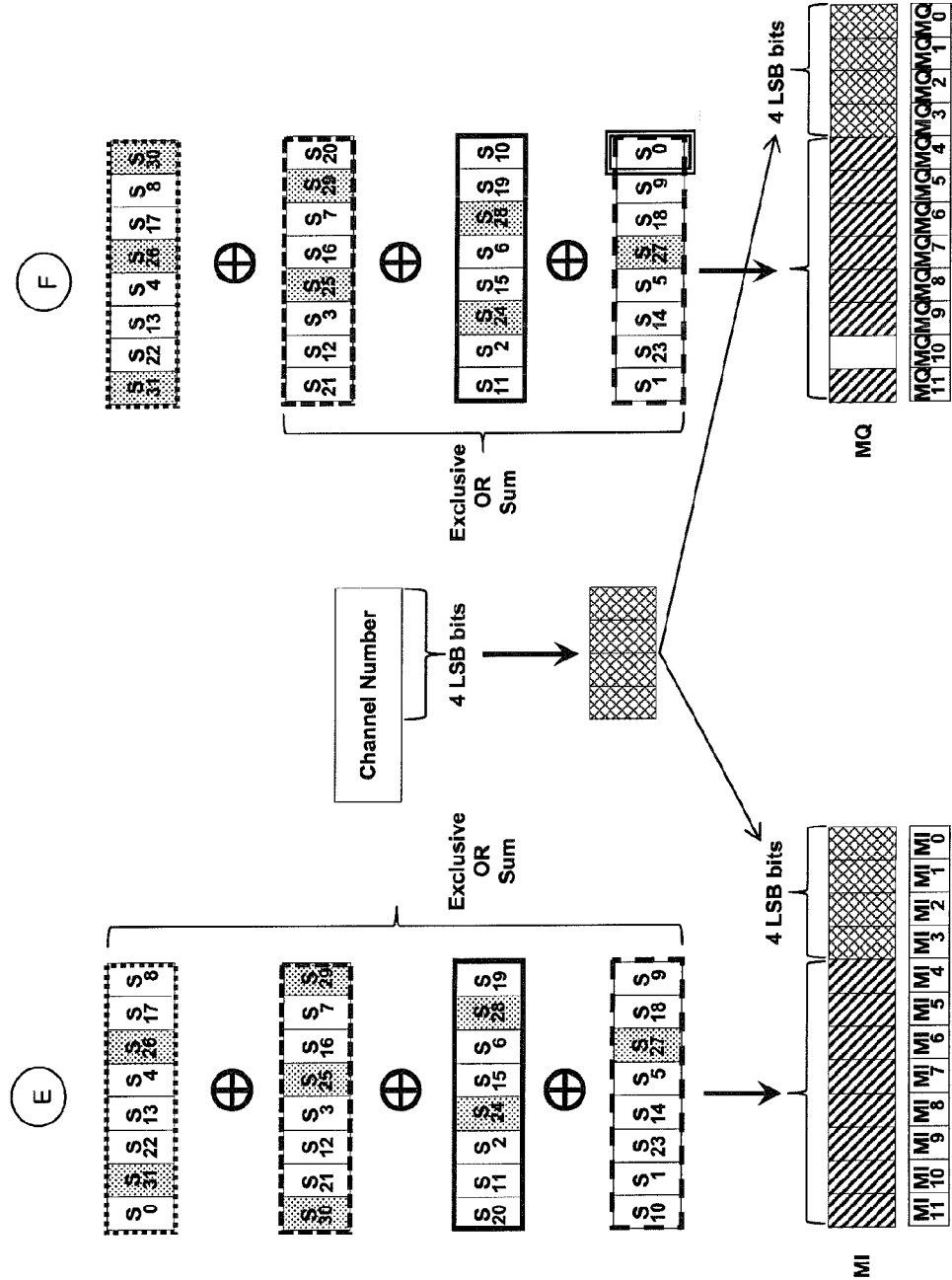

The changed parts compared to FIGS. 8A-8B are underlined in the above description (i.e. (A31 to A24) and (B31 to B24) and (B7 to B1, B32)). The final version is illustrated in FIG. 11A-11B.

Two types of additional enhancements can be combined and used altogether. For example, either enhancement 1 or enhancement 2 can be applied together either enhancement 3 or enhancement 4. Many other combinations or sub-combinations would also be possible without any restrictions.

The present inventors recognized that the techniques for generating MI and MQ masks could be improved. It is important to note that such problem recognition was based upon concentrated investigation, rigorous simulations, and experimental testing conducted by the present inventors. As a result, the present inventors have found that an MI mask and an MQ mask for PN quadrature covering can be generated by using certain bits of an assigned channel number for the access channel and by performing exclusive OR operations on certain bits of the received access long code mask $MI_{ACMAC}$ and the received access long code mask $MQ_{ACMAC}$. In particular, the concept of using certain bits of an assigned channel number and by performing exclusive OR operations on certain bits of the received access long code masks $MI_{ACMAC}$ and $MQ_{ACMAC}$ have never been provided or suggested in any known method prior to the work done by the present inventors as described in this disclosure and in the priority document disclosures.

To sum up, the various inventive concepts and features of the present disclosure can be described in the following manner.

Figure 12:
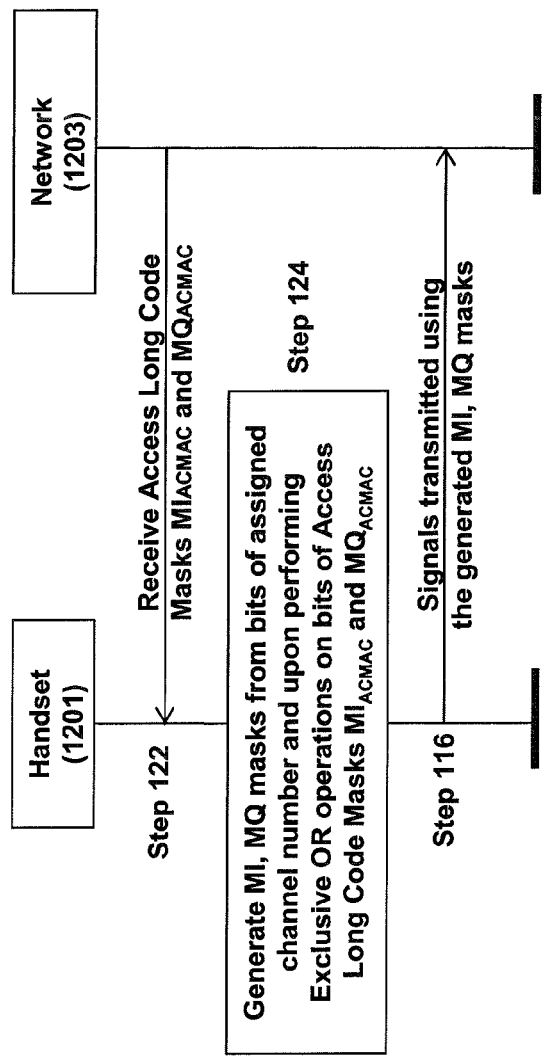
FIG. 12 shows an exemplary signal flow and procedures between a handset and network that can implement the embodiments described herein.

FIG. 12 shows an exemplary signal flow and procedures between a handset and network that can implement the embodiments described herein. Here, handset 1201 receives access long code masks $MI_{ACMAC}$ and $MQ_{ACMAC}$ from network 1203 (step 122). Handset 1201 generates MI, MQ masks from bits of assigned channel number by performing exclusive OR operations on bits of access long code masks $MI_{ACMAC}$ and $MQ_{ACMAC}$ (step 124). Handset 1201 then transmits signals using the generated MI, MQ masks to network 1203 (step 116).

The exemplary embodiments described herein provide a method of performing Pseudo-Noise (PN) quadrature covering for transmitting data via an access channel, the method comprising: receiving an access long code mask $MI_{ACMAC}$ and an access long code mask $MQ_{ACMAC}$ from an upper layer, said access long code mask $MI_{ACMAC}$ and said access long code mask $MQ_{ACMAC}$ being defined in a reverse traffic channel Medium Access Control (MAC) protocol; generating an MI mask and an MQ mask for PN quadrature covering by using certain bits of an assigned channel number for the access channel and by performing exclusive OR operations on certain bits of the received access long code mask $MI_{ACMAC}$ and performing exclusive OR operations on certain bits of the received access long code mask $MQ_{ACMAC}$, said MI mask being a masking sequence for an In-phase (I) branch of a Quadrature Phase-Shift Keying (QPSK) modulation for the access channel and said MQ mask being a masking sequence for a Quadrature-phase (Q) branch of the QPSK modulation for the access channel; and transmitting signals via the access channel based on the generated MI mask and the generated MQ mask.

Additionally, the access long code mask $MI_{ACMAC}$ and the access long code mask $MQ_{ACMAC}$ are respectively 42 bits in length. The generated MI mask and the generated MQ mask are respectively 12 bits in length, and the MI mask having MI11 to MI0, where MI11 indicates the 12th bit of the MI mask and MI0 indicates the 1st bit of the MI mask, and the MQ mask having MQ11 to MQ0, where MQ11 indicates the 12th bit of the MQ mask and MQ0 indicates the 1st bit of the MQ mask.

The generating step further comprises: setting MI3 to MI0 of a MI mask and MQ3 to MQ0 of a MQ mask to the lower 4 bits of the assigned channel number, wherein the MI mask and the MQ mask are respectively comprised of 12 bits and used for PN quadrature covering.

The generating step further comprises: setting MI11 to MI4 of the MI mask to be equal to the result of (A31 to A24)⊕(A23 to A16)⊕(A15 to A8)⊕(A7 to A0), where A31 to A0 are lower 32 bits of the 42-bit access long code mask $MI_{ACMAC}$, and where (A31 to A24) is an 8-bit sequence starting from the 32nd bit to the 25th bit of the $MI_{ACMAC}$.

The generating step further comprises: setting MQ11 to MQ4 of the MQ mask to be equal to the result of (B31 to B24)⊕(B23 to B16)⊕(B15 to B8)⊕(B7 to B1, B32), where B31 to B0 are lower 32 bits of the 42-bit access long code mask $MQ_{ACMAC}$, where B32 is the 33rd bit of the $MQ_{ACMAC}$, where (B31 to B24) is an 8-bit sequence starting from the 32nd bit to the 25th bit of the $MQ_{ACMAC}$, wherein (B7 to B1, B32) comprises an 8-bit sequence having the first 7 bits filled with the 8th bit to the 2nd bit of the $MQ_{ACMAC}$ and the last bit filled with the 33rd bit of the $MQ_{ACMAC}$.

Figure 13:
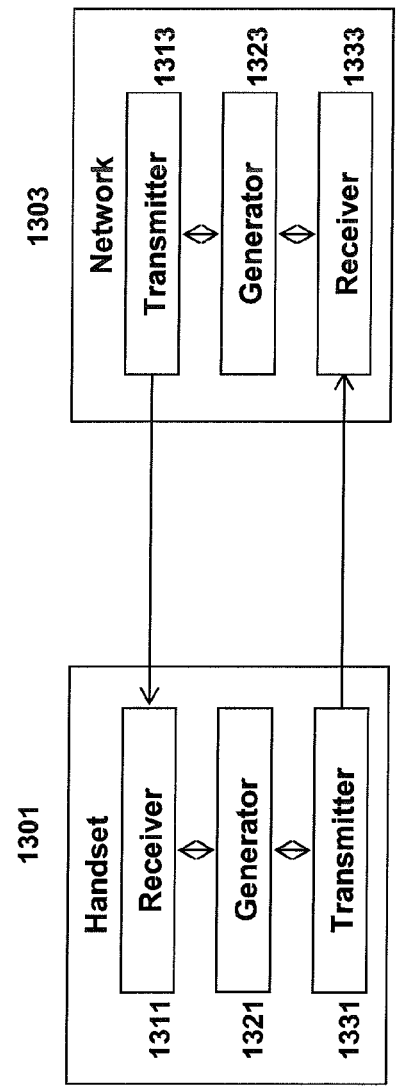
FIG. 13 shows exemplary structures for a handset and network that can implement the embodiments described herein.

Also, with reference to FIG. 13, the present disclosure also provides an apparatus (e.g., device having appropriate hardware components such as a processing unit, controller, CPU, microprocessor(s), memory or storage, etc. that access and execute corresponding software code) that is able to implement and carry out the above-described method. Specifically, a handset 1301 may include a receiver 1311, generator 1321 and a transmitter 1331. Also, a network device 1303 may include a receiver 1313, generator 1323 and a transmitter 1333.

The exemplary embodiments described herein provide an apparatus to perform Pseudo-Noise (PN) quadrature covering for transmitting data via an access channel, the apparatus comprising: a receiver that receives an access long code mask $MI_{ACMAC}$ and an access long code mask $MQ_{ACMAC}$ from an upper layer, said access long code mask $MI_{ACMAC}$ and said access long code mask $MQ_{ACMAC}$ being defined in a reverse traffic channel Medium Access Control (MAC) protocol; a generator that generates an MI mask and an MQ mask for PN quadrature covering by using certain bits of an assigned channel number for the access channel and by performing exclusive OR operations on certain bits of the received access long code mask $MI_{ACMAC}$ and performing exclusive OR operations on certain bits of the received access long code mask $MQ_{ACMAC}$, said MI mask being a masking sequence for an In-phase (I) branch of a Quadrature Phase-Shift Keying (QPSK) modulation for the access channel and said MQ mask being a masking sequence for a Quadrature-phase (Q) branch of the QPSK modulation for the access channel; and a transmitter that transmitting signals via the access channel based on the generated MI mask and the generated MQ mask.

Additionally, the access long code mask $MI_{ACMAC}$ and the access long code mask $MQ_{ACMAC}$ are respectively 42 bits in length.

The generated MI mask and the generated MQ mask are respectively 12 bits in length, and the MI mask having MI11 to MI0, where MI11 indicates the 12th bit of the MI mask and MI0 indicates the 1st bit of the MI mask, and the MQ mask having MQ11 to MQ0, where MQ11 indicates the 12th bit of the MQ mask and MQ0 indicates the 1st bit of the MQ mask.

The generator further performs the generating step by: setting MI3 to MI0 of a MI mask and MQ3 to MQ0 of a MQ mask to the lower 4 bits of the assigned channel number, wherein the MI mask and the MQ mask are respectively comprised of 12 bits and used for PN quadrature covering.

The generator further performs the generating step by: setting MI11 to MI4 of the MI mask to be equal to the result of (A31 to A24)⊕(A23 to A16)⊕(A15 to A8)⊕(A7 to A0), where A31 to A0 are lower 32 bits of the 42-bit access long code mask $MI_{ACMAC}$, and where (A31 to A24) is an 8-bit sequence starting from the 32nd bit to the 25th bit of the $MI_{ACMAC}$.

The generator further performs the generating step by: setting MQ11 to MQ4 of the MQ mask to be equal to the result of (B31 to B24)⊕(B23 to B16)⊕(B15 to B8)⊕(B7 to B1, B32), where B31 to B0 are lower 32 bits of the 42-bit access long code mask $MQ_{ACMAC}$, where B32 is the 33rd bit of the $MQ_{ACMAC}$, where (B31 to B24) is an 8-bit sequence starting from the 32nd bit to the 25th bit of the $MQ_{ACMAC}$, wherein (B7 to B1, B32) comprises an 8-bit sequence having the first 7 bits filled with the 8th bit to the 2nd bit of the $MQ_{ACMAC}$ and the last bit filled with the 33rd bit of the $MQ_{ACMAC}$.

The various features and concepts described herein may be implemented in software, hardware, or a combination thereof. For example, a computer program (that is executed by a processor, controller, CPU, etc. in a computer, a mobile terminal and/or a network device) that implements a method and apparatus for generating an MI mask and an MQ mask for PN quadrature covering by using certain bits of an assigned channel number for the access channel and by performing exclusive OR operations on certain bits of the received access long code mask $MI_{ACMAC}$ and the received access long code mask $MQ_{ACMAC}$ may be comprised of one or more program code sections or modules for performing various tasks. Similarly, a software tool (that is executed by a processor, controller, CPU, etc. in a computer, a mobile terminal and/or a network device) for a method and apparatus for generating such MI and MQ masks may comprise program code sections or modules that are executed by a processor (or other controller such as a CPU) for performing various tasks.

The method and apparatus for generating such MI and MQ masks are compatible with various types of technologies and standards. Certain concepts described herein are related to particular standards, such as 3GPP (LTE, LTE-Advanced, etc.), IEEE, 4G, GSM, WCDMA, and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support the generating an MI mask and an MQ mask for PN quadrature covering by using certain bits of an assigned channel number for the access channel and by performing exclusive OR operations on certain bits of the received access long code mask $MI_{ACMAC}$ and the received access long code mask $MQ_{ACMAC}$.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method for receiving Pseudo-Noise (PN) quadrature covering data via an access channel by an access network, the method comprising:

transmitting an access long code mask $MI_{ACMAC}$ and an access long code mask $MQ_{ACMAC}$ to an access terminal; and receiving the data covered with a PNI sequence and a PNQ sequence from the access terminal, wherein the $MI_{ACMAC}$ and the $MQ_{ACMAC}$ are related with an Access channel Medium Access Control (MAC) protocol, wherein the PNI is a sequence generating by the access terminal summed by a MI mask and a PN sequence generated by a polynomial $PI(x)=x^{12}+x^{6}+x^{4}+x+1$ for an In-phase branch of a Quadrature Phase Shift Keying (QPSK) and the PNQ is a sequence generating by the access terminal summed by a MQ mask and a PN sequence generated by a polynomial $PQ(x)=x^{12}+x^{9}+x^{3}+x^{2}+1$ for a Quadrature-phase branch of a Quadrature Phase Shift Keying (QPSK), wherein the MI mask are a mask sequence generating by the access terminal for the In-phase branch of the Quadrature Phase Shift Keying (QPSK) symbol of the access channel and the MQ mask are a mask sequence generating by the access terminal for the Quadrature-phase branch of the QPSK symbol of the access channel, wherein MI3 to MI0 of the MI mask and MQ3 to MQ0 of the MQ mask are set to the lower 4 bits of an assigned channel number, wherein MI11 to MI4 of the MI mask are set to be equal to the result of (A31 to A24) ⊕(A23 to A16) ⊕(A15 to A8) ⊕(A7 to A0), where A31 to A0 are lower 32 bits of the $MI_{ACMAC}$, where (A31 to A24) is an 8-bit sequence starting from the 32nd bit to the 25th bit of the $MI_{ACMAC}$, wherein MQ11 to MQ4 of the MQ mask are set to be equal to the result of (B31 to B24) ⊕(B23 to B16) ⊕(B15 to B8) ⊕(B7 to B1, B32), where B31 to B0 are lower 32 bits of the $MQ_{ACMAC}$, where B32 is the 33rd bit of the $MQ_{ACMAC}$, where (B31 to B24) is an 8-bit sequence starting from the 32nd bit to the 25th bit of the $MQ_{ACMAC}$, wherein (B7 to B1, B32) comprises an 8-bit sequence having the first 7 bits filled with the 8th bit to the 2nd bit of the $MQ_{ACMAC}$ and the last bit filled with the 33rd bit of the $MQ_{ACMAC}$, and wherein ⊕ denotes exclusive OR operation.

2. The method of claim 1, wherein the access long code mask $MI_{ACMAC}$ and the access long code mask $MQ_{ACMAC}$ are respectively 42 bits in length.

3. The method of claim 2, wherein the MI mask and the MQ mask are respectively 12 bits in length, and the MI mask having MI11 to MI0, where MI11 indicates the 12th bit of the MI mask and MI0 indicates the 1st bit of the MI mask, and the MQ mask having MQ11 to MQ0, where MQ11 indicates the 12th bit of the MQ mask and MQ0 indicates the 1st bit of the MQ mask.

4. An apparatus to receive Pseudo-Noise (PN) quadrature covering data via an access channel from an access terminal, the apparatus comprising:

a transmitter that transmits an access long code mask $MI_{ACMAC}$ and an access long code mask $MQ_{ACMAC}$ to an access terminal; and a receiver that receives the data covered with a PNI sequence and a PNQ sequence from the access terminal, wherein the $MI_{ACMAC}$ and the $MQ_{ACMAC}$ are related with an Access channel Medium Access Control (MAC) protocol, wherein the PNI is a sequence generating by the access terminal summed by a MI mask and a PN sequence generated by a polynomial $PI(x)=x^{12}+x^{6}+x^{4}+x+1$ for an In-phase branch of a Quadrature Phase Shift Keying (QPSK) and the PNQ is a sequence generating by the access terminal summed by a MQ mask and a PN sequence generated by a polynomial $PQ(x)=x^{12}+x^{9}+x^{3}+x^{2}+1$ for a Quadrature-phase branch of a Quadrature Phase Shift Keying (QPSK), wherein the MI mask are a mask sequence generating by the access terminal for the In-phase branch of the Quadrature Phase Shift Keying (QPSK) symbol of the access channel and the MQ mask are a mask sequence generating by the access terminal for the Quadrature-phase branch of the QPSK symbol of the access channel, wherein MI3 to MI0 of the MI mask and MQ3 to MQ0 of the MQ mask are set to the lower 4 bits of an assigned channel number, wherein MI11 to MI4 of the MI mask are set to be equal to the result of (A31 to A24) ⊕(A23 to A16) ⊕(A15 to A8) ⊕(A7 to A0), where A31 to A0 are lower 32 bits of the $MI_{ACMAC}$, where (A31 to A24) is an 8-bit sequence starting from the 32nd bit to the 25th bit of the $MI_{ACMAC}$, wherein MQ11 to MQ4 of the MQ mask are set to be equal to the result of (B31 to B24) ⊕(B23 to B16) ⊕(B15 to B8) ⊕(B7 to B1, B32), where B31 to B0 are lower 32 bits of the $MQ_{ACMAC}$, where B32 is the 33rd bit of the $MQ_{ACMAC}$, where (B31 to B24) is an 8-bit sequence starting from the 32nd bit to the 25th bit of the $MQ_{ACMAC}$, wherein (B7 to B1, B32) comprises an 8-bit sequence having the first 7 bits filled with the 8th bit to the 2nd bit of the $MQ_{ACMAC}$ and the last bit filled with the 33rd bit of the $MQ_{ACMAC}$, and wherein ⊕ denotes exclusive OR operation.

5. The apparatus of claim 4, wherein the access long code mask $MI_{ACMAC}$ and the access long code mask $MQ_{ACMAC}$ are respectively 42 bits in length.

6. The apparatus of claim 5, wherein the MI mask and the MQ mask are respectively 12 bits in length, and the MI mask having MI11 to MI0, where MI11 indicates the 12th bit of the MI mask and MI0 indicates the 1st bit of the MI mask, and the MQ mask having MQ11 to MQ0, where MQ11 indicates the 12th bit of the MQ mask and MQ0 indicates the 1st bit of the MQ mask.

\* \* \* \* \*